United States Patent
Balakrishnan

(10) Patent No.: US 7,583,670 B2
(45) Date of Patent: Sep. 1, 2009

(54) METHOD AND SYSTEM FOR MANAGING NETWORK TRAFFIC BASED ON MATCHING CRITERIA

(75) Inventor: Ambika Balakrishnan, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 792 days.

(21) Appl. No.: 10/965,022

(22) Filed: Oct. 14, 2004

(65) Prior Publication Data

US 2006/0083167 A1   Apr. 20, 2006

(51) Int. Cl.
*H04L 12/28* (2006.01)
(52) U.S. Cl. .......................... 370/392; 370/401
(58) Field of Classification Search ............... 370/392, 370/401, 352
See application file for complete search history.

(56) References Cited

U.S. PATENT DOCUMENTS

| 5,606,668 | A | * | 2/1997 | Shwed | 726/13 |
| 5,915,008 | A | * | 6/1999 | Dulman | 379/221.08 |
| 6,219,706 | B1 | | 4/2001 | Fan et al. | |
| 7,251,745 | B2 | * | 7/2007 | Koch et al. | 714/11 |
| 7,281,211 | B2 | * | 10/2007 | Jeannette et al. | 715/234 |

* cited by examiner

*Primary Examiner*—Ricky Ngo
*Assistant Examiner*—Chandrahas Patel
(74) *Attorney, Agent, or Firm*—Trellis IP Law Group, PC

(57) ABSTRACT

Methods and systems are provided for managing network traffic in a network device based on matching criteria. The method includes providing a plurality of objects associated with a packet of the network traffic; creating a set of criteria corresponding to the type of objects; and accepting the packet if the plurality of objects satisfies the set of criteria.

21 Claims, 5 Drawing Sheets

METHOD AND SYSTEM FOR MANAGING NETWORK TRAFFIC BASED ON MATCHING CRITERIA

BACKGROUND OF THE INVENTION

1. Field of Invention

The invention relates in general to the field of software matching. More specifically, embodiments of the invention relate to methods and systems for managing network traffic in a network device based on matching criteria.

2. Description of the Background Art

Network devices are typically used to manage network traffic in a network. Each network device has an Access Control List (ACL) that determines which packets can traverse the network device. An incoming packet is allowed to traverse the network device if the objects associated with the packet conform to the rules of the ACL of the network device. The objects associated with the Transmission Control Packet [TCP] packet may be, for example, TCP flags, destination ports, and source ports.

The ACLs support matching criteria based on 'OR'ing of objects associated with a packet in the network traffic. More specifically, the ACLs support matching on a combination of packet flags associated with the objects. This matching translates to an 'OR' condition. Therefore, an incoming packet is transmitted if any of the packet flag of the incoming packet matches a packet flag specified in the ACL. There may be a security loophole in case of a packet having all packet flags set, as at least one packet flag of the packet may match with the packet flag specified in the ACL. Further, the known ACLs do not support matching based on packet flags that are not set.

SUMMARY OF EMBODIMENTS OF THE INVENTION

In an embodiment of the invention, a method for managing network traffic in a network device is provided. The method includes providing a plurality of objects associated with a packet of the network traffic; creating a set of criteria corresponding to the type of objects; and accepting the packet if the plurality of objects satisfies the set of criteria. The set of criteria includes a 'set criterion' and/or a 'not-set criterion'. In an embodiment of the invention, the 'set criterion' is prefixed by a '+' sign to denote the criterion for selecting the object. In another embodiment of the invention, the 'not-set criterion' is prefixed by a '−' sign to denote that the absence of this object in the incoming packet is the criterion for matching.

In another embodiment of the invention, a method for matching objects in an application is provided. The method includes providing a network device having a plurality of control list objects; and matching correspondingly at least one control list object of the network device with at least one object of an application based on the objects being present or not present in the application.

In yet another embodiment of the invention, a method for determining if a packet is acceptable for transmitting is provided. The method includes providing a router with an Access Control List having matching criteria based on packet flags; transmitting a packet having packet flags to an interface of the router that has an Access Control List; and matching the packet flag of the packet with the criteria specified in the Access Control List. The set of criteria in the ACL includes a 'set criterion' and/or a 'not-set criterion'. In an embodiment of the invention, in the ACL, the field of interest in a packet is prefixed by a '+' sign to denote that the presence of this field in the incoming packet is the criterion for matching. In another embodiment of the invention, in the ACL, the field of interest in the packet is prefixed by a '−' sign to denote that the absence of this field in the incoming packet is the criterion for matching.

In another embodiment of the invention, a method for determining if a packet is allowed to transit a router is provided. The method includes providing a router including an Access Control Lists having matching criteria based on packet flags; receiving a packet having packet flags via an interface, such as access control interface, of the router; and matching the packet with the criteria mentioned in the Access Control Lists of the router for indicating that the packet is acceptable to be transmitted by the router.

In an embodiment of the invention, a system for managing network traffic in a network device is provided. The system includes means for providing a plurality of objects associated with a packet of the network traffic; and means for correspondingly matching at least one object of the network device with at least one object associated with the packet.

These provisions together with the various ancillary provisions and features which will become apparent to those artisans possessing skill in the art as the following description proceeds are attained by devices, assemblies, systems and methods of embodiments of the present invention, various embodiments thereof being shown with reference to the accompanying drawings, by way of example only, wherein:

DETAILED DESCRIPTION OF EMBODIMENTS OF THE INVENTION

Various embodiments of the invention provide methods and systems for managing network traffic in a network device, such as a router and switch, based on matching criteria.

Figure 1:
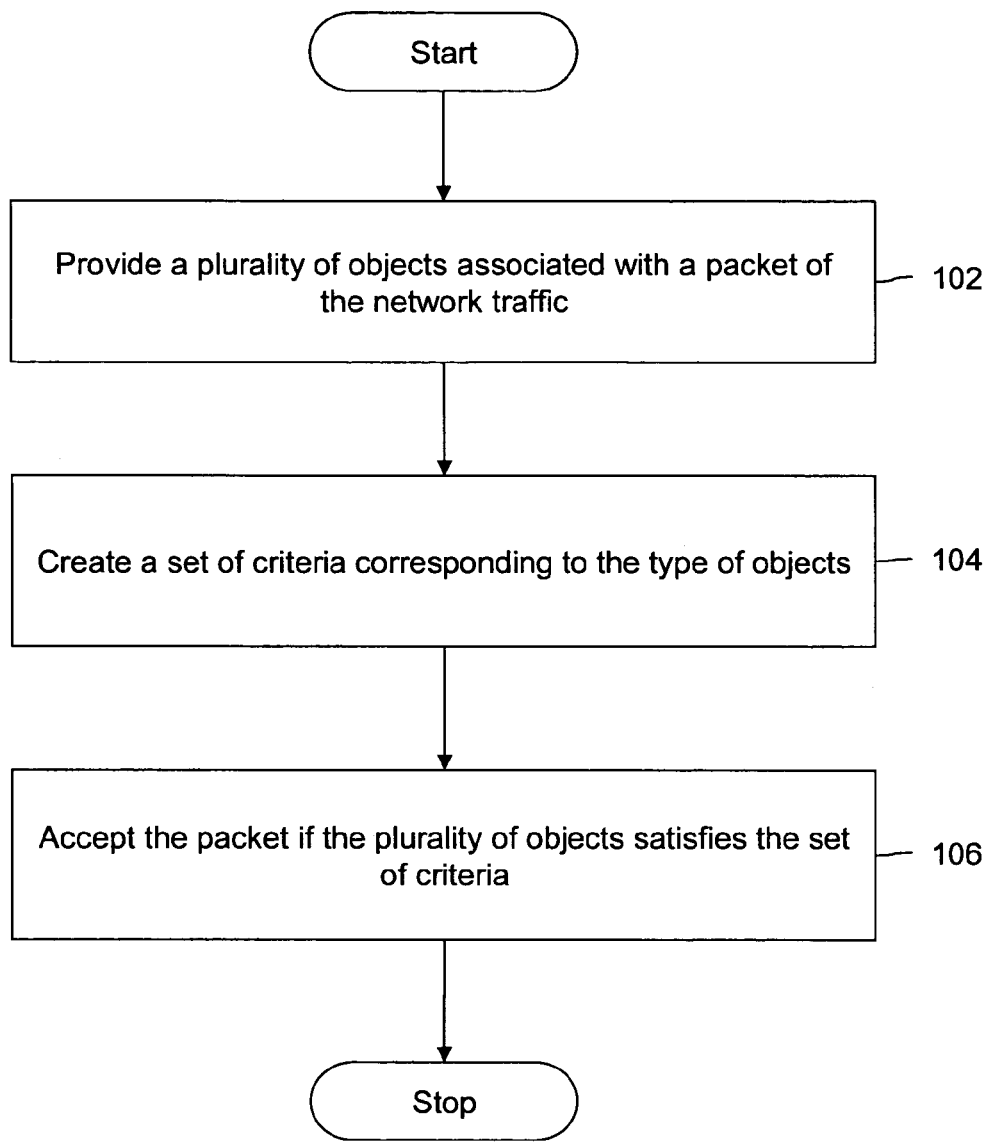
FIG. 1 is a flowchart illustrating a method for managing network traffic in a network device, in accordance with an exemplary embodiment of the invention.

FIG. 1 is a flowchart illustrating a method for managing network traffic in a network device, in accordance with an exemplary embodiment of the invention. At step 102, a plurality of objects associated with a packet of the network traffic is provided. A packet generally refers to a unit of data, which can be of any protocol type. A packet may be a Transmission Control Protocol (TCP) packet. The objects associated with the packet may be, for example, a source port of the packet and a destination port of the packet.

A set of criteria corresponding to the type of objects is then created, at step 104. In various embodiments of the invention, the set of criteria corresponds to at least one packet field associated with a configuration of the network device. A packet flag refers to one of the packet fields. In various embodiments of the invention, a packet flag corresponds to the type of objects. For example, if the packet is a TCP packet, then the packet flag is a TCP flag. Exemplary TCP flags may be for example, syn, ack, fin, urg, psh, and rst. In an embodiment of the invention, the set of criteria include at least one 'set criterion' for selecting the packet. In another embodiment of the invention, the set of criteria include at least one 'not-set criterion' for rejecting the packet. In yet another embodiment of the invention, the set of criteria includes at least one 'set criterion' and at least one 'not-set criterion' for managing the network traffic in the network device. Further, in various embodiments of the invention, if a packet flag is not present in the ACL, then it does not matter if the packet flag is present or not present in the packet.

In an embodiment of the invention, a '+' sign is prefixed to a packet flag in the 'set criterion', to signify that the packet is considered a match if the packet flag is present in the packet. In another embodiment of the invention, a '−' sign is prefixed to a packet flag, to signify that the packet is considered a match if the packet flag is not present in the packet. Once a packet matches the criteria specified, the packet can be accepted or rejected based on the policy of the network device.

At step 106, the packet is accepted, if the plurality of objects satisfies the set of criteria. For example, the set of criteria may include a 'set criterion' such that the packets having the TCP flags syn and ack set, are accepted. Further, the set of criteria may include a 'not-set criterion', for example, the packets having TCP flag fin not set are accepted. In an embodiment of the invention, the accepted packet is transmitted to the network, if the accepted packet is an outgoing packet. In another embodiment of the invention, the accepted packet is transmitted to the network device, if the accepted packet is an incoming packet.

Figure 2:
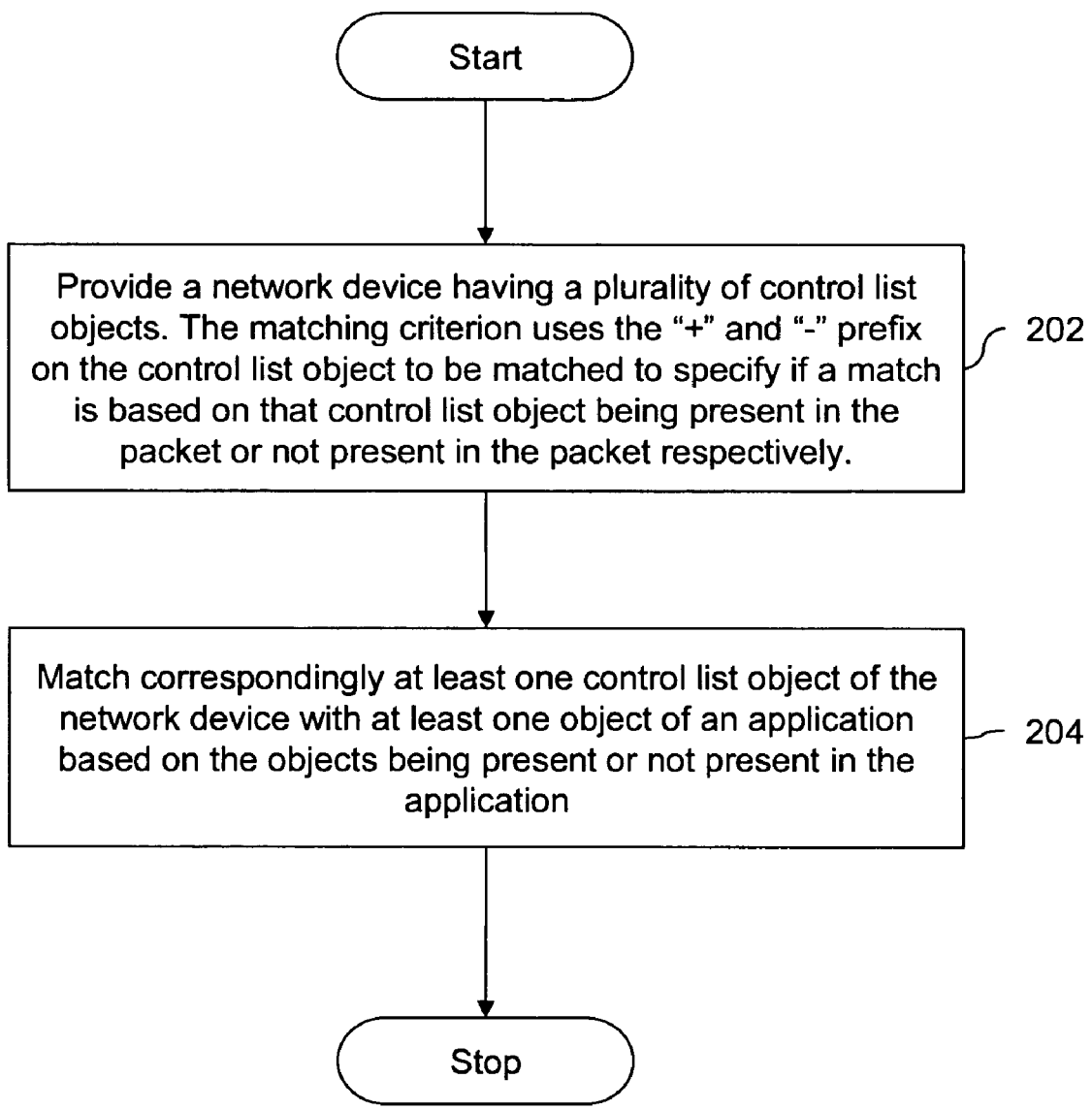
FIG. 2 is a flowchart illustrating a method for matching objects in an application with the corresponding objects of a network device, in accordance with an exemplary embodiment of the invention.

FIG. 2 is a flowchart illustrating a method for matching objects in an application with the corresponding objects of a network device, in accordance with an exemplary embodiment of the invention. In various embodiments of the invention, the matching of objects may be performed to manage network traffic in a network. The application may be a packet of the network traffic. At step 202, a network device having a plurality of control list objects is provided. The control list objects may be, for example, filtering TCP packets in an Access Control List (ACL). The ACL is generally implemented as a data structure such as a tree that has the information (to be used by the network operating system) to determine the access rights of each packet. At step 204, at least one control list object of the network device is correspondingly matched with at least one object of the application. The matching is performed based on the objects being present or not present in the application. The matching criteria may be at least one of a 'set criterion' or a 'not-set criterion', as described in conjunction with FIG. 1. In an embodiment of the invention, a '+' sign is prefixed to a control list object in the 'set criterion', to signify that the packet is considered a match if the control list object is present in the packet. In another embodiment of the invention, a '−' sign is prefixed to a control list object, to signify that the packet is considered a match if the control list object is not present in the packet. Once a packet matches the criteria specified, the packet can be accepted or rejected based on the policy of the network device.

Figure 3:
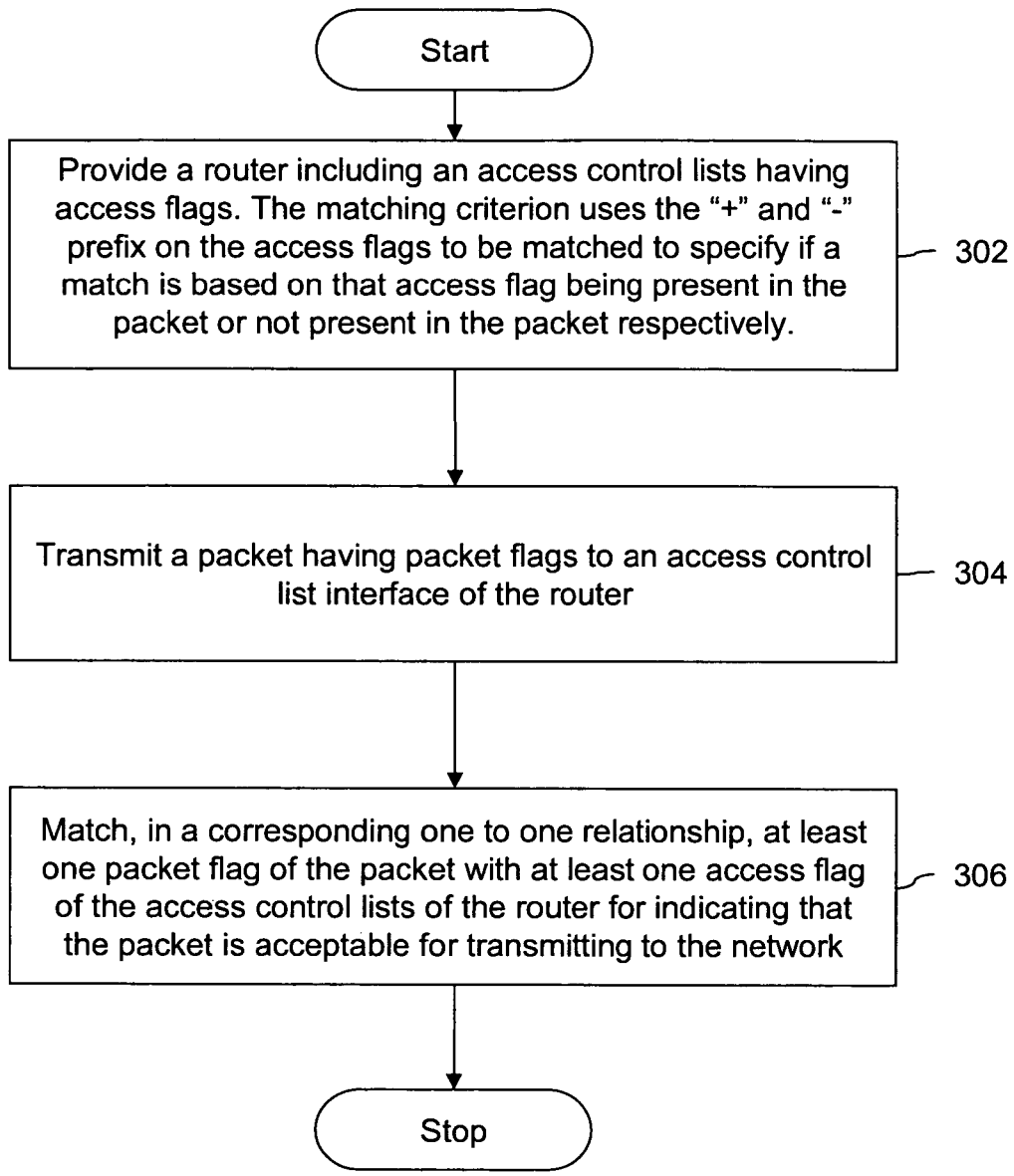
FIG. 3 is a flowchart illustrating a method for determining if a packet is acceptable for transmitting to a network, in accordance with an exemplary embodiment of the invention.

FIG. 3 is a flowchart illustrating a method for determining if a packet is acceptable for transmitting to a network, in accordance with an exemplary embodiment of the invention. At step 302, a router including an ACL having match condition based on packet flags is provided. At step 304, a packet having packet flags is transmitted to an interface of the router that has an ACL. Subsequently, at least one packet flag of the packet is matched with at least one packet flag as specified in the ACL of the router, at step 306. The matching is performed based on the matching criteria for indicating that the packet is acceptable for transmitting to the network. If the packet flag(s) match the conditions in the ACL, then the packet is transmitted to the network. If the packet flag(s) do not satisfy the conditions in the ACL, the packet is not transmitted. The matching criteria may be at least one of a 'set criterion' or a 'not-set criterion', as described in conjunction with FIG. 1. In an embodiment of the invention, a '+' sign is prefixed to an access flag in the 'set criterion', to signify that the packet is considered a match if the access flag is present in the packet. In another embodiment of the invention, a '−' sign is prefixed to an access flag, to signify that the packet is considered a match if the access flag is not present in the packet. Once a packet matches the criteria specified, the packet can be accepted or rejected based on the policy of the network device.

Figure 4:
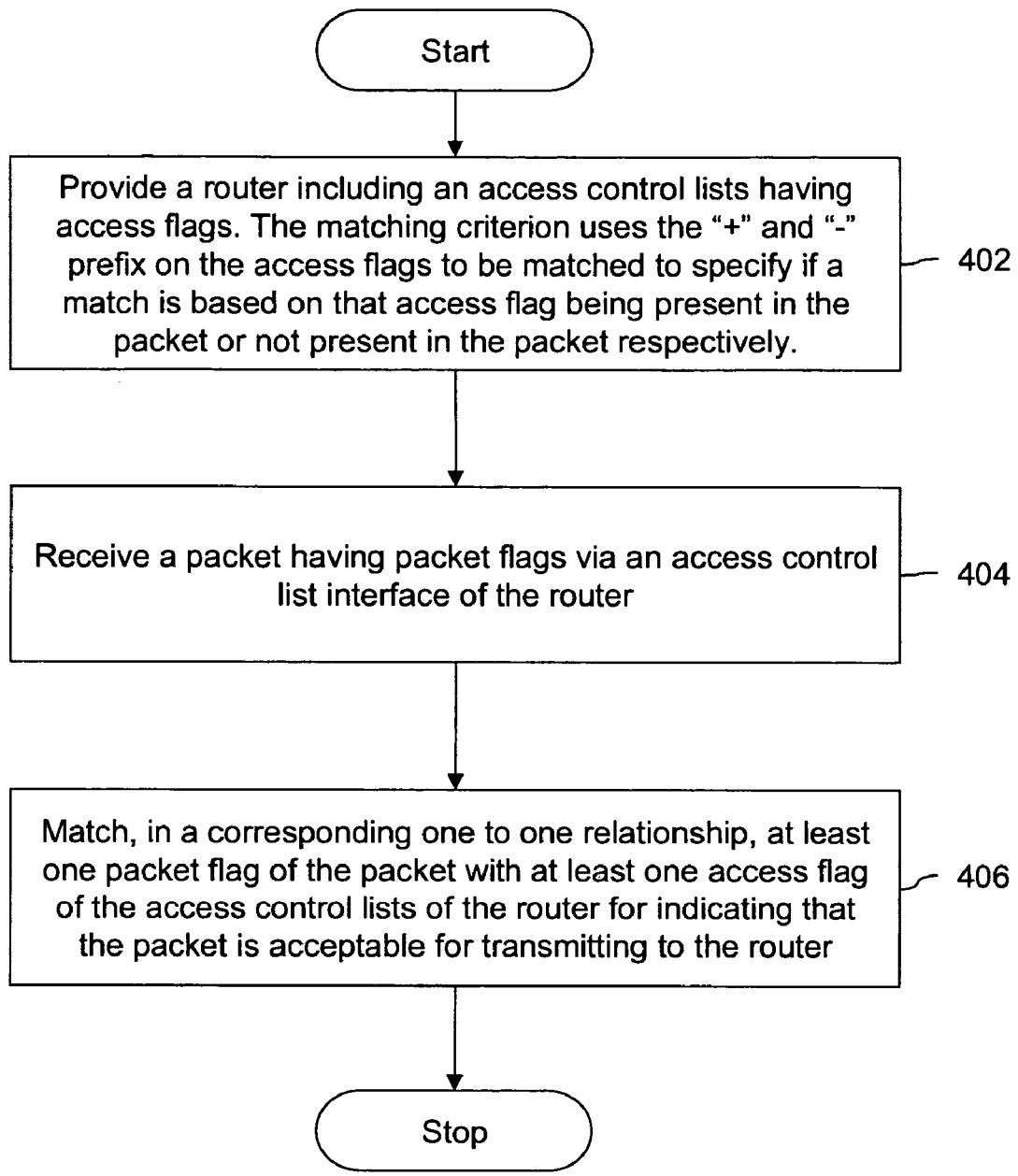
FIG. 4 is a flowchart illustrating a method for determining if a packet is allowed to transit a router, in accordance with an exemplary embodiment of the invention.

FIG. 4 is a flowchart illustrating a method for determining if a packet is allowed to transit a router, in accordance with an exemplary embodiment of the invention. At step 402, a router including an ACL having access flags is provided. At step 404, a packet having packet flags is received via an interface of the router that has an ACL. Subsequently, at least one packet flag of the packet is matched in a corresponding one-to-one relationship with at least one access flag of the ACL of the router, at step 406. The matching is performed based on the matching criteria for indicating that the packet is acceptable for transmitting to the router. If the packet flag(s) and the access flag(s) match, then the packet is transmitted to the router. If the packet flag(s) and the access flag(s) do not match, the packet is not transmitted. The matching criteria may be at least one of a 'set criterion' or a 'not-set criterion', as described in conjunction with FIG. 1. In an embodiment of the invention, a '+' sign is prefixed to an access flag in the 'set criterion', to signify that the packet is considered a match if the access flag is present in the packet. In another embodiment of the invention, a '−' sign is prefixed to an access flag, to signify that the packet is considered a match if the access flag is not present in the packet. Once a packet matches the criteria specified, the packet can be accepted or rejected based on the policy of the network device.

Figure 5:
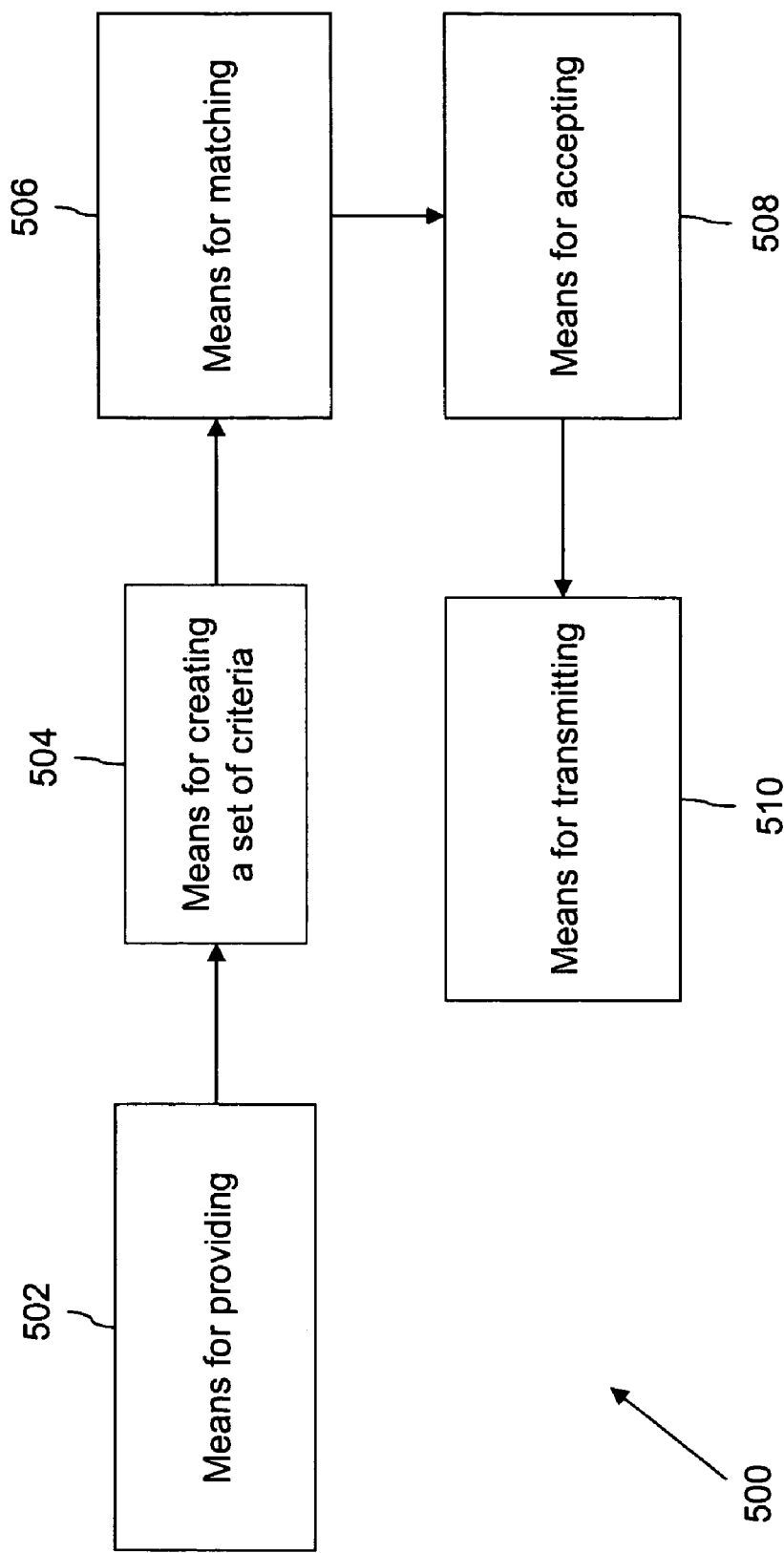
FIG. 5 is a block diagram of a system for managing network traffic in a network device, in accordance with an exemplary embodiment of the invention.

FIG. 5 is a block diagram of a system 500 for managing network traffic in a network device, in accordance with an exemplary embodiment of the invention. In various embodiment of the invention, system 500 includes a means for providing 502, a means for creating a set of criteria 504, a means for matching 506, a means for accepting 508 and a means for transmitting 510. In various embodiments of the invention, the network device may be a router.

Means for providing 502 provides a plurality of objects associated with a packet of the network traffic. The objects associated with the packet may be, for example the packet fields. In an embodiment of the invention, the object associated with a TCP packet may be TCP flags. In various embodiments of the invention, means for providing 502 may be a software module.

Means for creating a set of criteria 504 creates a set of criteria corresponding to the type of objects. The set of criteria corresponds to at least one packet flag associated with a configuration of the network device; the packet flag may correspond to the type of objects associated with the packet. Further, the set of criteria may include a 'set criterion' and/or a 'not-set criterion'. In an embodiment of the invention, a '+' sign is prefixed to a packet flag in the 'set criterion', to signify that the packet is considered a match if the packet flag is present in the packet. In another embodiment of the invention, a '−' sign is prefixed to a packet flag, to signify that the packet is considered a match if the packet flag is not present in the packet. Once a packet matches the criteria specified, the packet can be accepted or rejected based on the policy of the network device. In various embodiments of the invention, means for creating 504 may be a software module.

Means for matching 506 correspondingly matches the objects of the network device with the objects associated with the packet based upon the set of criteria, as described in conjunction with FIG. 1. In various embodiments of the invention, means for matching 506 may be a software module. In an embodiment of the invention, the matching is performed by using keywords such as 'match-any' and 'match-all', programmed on an Internetworking Operation Systems (IOS) of the network device. 'Match-any' keyword transmits the packet if at least one criterion from the set of criteria is satisfied. For example, a command for TCP flag filtering, also referred to as Access Control Entry (ACE), entered on the Command Line Interface (CLI) may be, permit tcp <src> <dst> match-any+syn+ack This ACE allows the packet if at least one of syn and ack are set on the packet. In an embodiment of the invention, the code for 'Match-any' keyword may be as follows:

if ((match_flags & match_mask) ^ (~packet_flags & match_mask))

'Match-all' keyword transmits the packet if each criterion from the set of criteria is satisfied. For example, an ACE, for TCP flag filtering entered on the CLI may be, permit tcp <src> <dst> match-all+syn+ack−fin This ACE allows the packet only if syn and ack are set and fin is not set on the packet. In an embodiment of the invention, the code for 'Match-any' keyword may be as follows:

if ((match_flags & match_mask)==(packet_flags & match_mask))

In a further example, an ip ACL for TCP flag filtering entered on the CLI may be, permit tcp any any match-all+syn+ack−fin deny tcp any any match-any+psh−rst permit ip any any The first ACE allows the packet only if syn and ack are set and fin is not set on the packet. The second ACE does not allow the packet if psh is set or rst is not set on the packet. The last ACE accepts all packets.

Means for accepting 508 accepts the packet if the plurality of objects associated with the network device satisfies the set of criteria. Means for transmitting 510 then transmits the accepted packet. In an embodiment of the invention, means for transmitting 510 transmits the accepted packet to the network, if the accepted packet is an outgoing packet. In another embodiment of the invention, means for transmitting 510 transmits the accepted packet to the network device, if the accepted packet is an incoming packet. Means for transmitting 510 may include, for example, 'permit' and 'deny' keyword programmed on the IOS. Further, various embodiments of the present invention may be implemented on Cisco's IOS ACL and/or IOS Turbo ACL.

In various embodiments of the invention, system 500 may be an ACL interface. In this embodiment, means for providing 502 provides an ACL having matching criteria based on packet flags. Means for transmitting 510 transmits a packet having packet flags to the ACL interface of the router. Subsequently, means for matching 506 matches, in a corresponding one-to-one relationship, at least one packet flag with at least one access criteria of the ACL of the router. Thereafter, if at least one packet flag matches with at least one access criteria of the ACL, means for transmitting 510 transmits the outgoing packet to the network and the incoming packet to the network device.

The various embodiments of the invention provide a method and a system that enable management of network traffic based on matching criteria. The matching criteria include a 'set criterion' and/or a 'not-set criterion'. Further, having the '+'and '−' signs help the user to identify the matching criteria. The various embodiments of the invention may further be extended to any application in a network device for matching based on an object being present or not present or don't care.

Although the invention has been discussed with respect to specific embodiments thereof, these embodiments are merely illustrative, and not restrictive, of the invention. Any suitable programming language can be used to implement the routines of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain and store the program for use by or in connection with the instruction execution system, apparatus, system or device. The computer readable medium can be, by way of example only but not by limitation, a semiconductor system, apparatus, system, device, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method, comprising:
receiving a signal from a user input device to define an access control list (ACL) in a network device, the ACL having an ACL entry that defines a configuration of transmission control protocol (TCP) flags;
receiving a signal from the user input device to define a set indication for a first TCP flag in the ACL entry, wherein the defined set indication includes a '+' sign prefixing the first TCP flag in the ACL entry;
receiving a signal from the user input device to define a not-set indication for a second TCP flag in the ACL entry, wherein the defined not-set indication includes a '−' sign prefixing the second TCP flag in the ACL entry;
receiving a signal from the user input device to define a match all indication for the defined set and not-set indications in the ACL entry;
receiving a packet in the network device, the packet having first and second fields associated therewith, the first field corresponding to the first TCP flag, the second field corresponding to the second TCP flag; and
accepting the received packet in the network device if and only if the first field in the received packet is set and the second field in the received packet is not set.

2. The method of claim 1, wherein the ACL comprises an Internetworking Operating System (IOS) ACL.

3. The method of claim 1, further comprising accepting the received packet based on a policy of the network device, the network device comprising a router.

4. The method of claim 1, wherein the defined set indication that includes a '+' sign prefixing the first TCP flag in the ACL entry is input using a command line interface (CLI) via the user input device.

5. The method of claim 1, wherein the defined not-set indication that includes a '−' sign prefixing the second TCP flag in the ACL entry is input using a CLI via the user input device.

6. The method of claim 1, further comprising sending the accepted packet to a location within the network device when the accepted packet is an incoming packet.

7. The method of claim 1, further comprising transmitting the accepted packet to another device coupled to the network device via a network when the accepted packet is an outgoing packet.

8. The method of claim 1, wherein the ACL entry comprises a TCP packet flag corresponding to a type of objects associated with the received packet.

9. The method of claim 1, wherein the ACL entry comprises a permit indication for indicating conditions on which the received packet is accepted by the network device.

10. The method of claim 9, wherein the permit indication is first on a line in the ACL entry.

11. A method, comprising:
   providing a router including an access control list (ACL) having an ACL entry of access flags;
   defining a set indication in the ACL entry for a first access flag by using a '+' sign prefixing the first access flag to indicate that a first packet flag being set in a packet is a first condition for matching;
   defining a not-set indication in the ACL entry for a second access flag by using a '−' sign prefixing the second access flag to indicate that a second packet flag being not set in the packet is a second condition for matching;
   defining a match all indication for the defined set and not-set indications in the ACL entry;
   receiving a packet having packet flags in an ACL interface of the router, the received packet having a first packet flag corresponding to the first access flag, the received packet having a second packet flag corresponding to the second access flag; and
   matching in a corresponding one-to-one relationship, the first and second packet flags of the received packet with the first and second access flags of the ACL of the router to satisfy both the first and second conditions for indicating that the received packet is acceptable for transmitting from the router.

12. The method of claim 11, wherein the first and second packet flags in the received packet comprise Transmission Control Protocol (TCP) flags.

13. A system, comprising:
   means for receiving a packet in a network device, the packet having a plurality of fields associated therewith;
   means for creating an access control list (ACL) in the network device, wherein the ACL comprises a packet flag associated with a configuration of the network device, the packet flag corresponding to a type of at least one field in the received packet;
   means for defining a set indication using a '+' sign in the ACL for a first field in the plurality of fields when the first field being set in the received packet is a first condition for matching, wherein the '+' sign prefixes a representation of the first field in the ACL;
   means for defining a not-set indication using a '−' sign in the ACL for a second field in the plurality of fields when the second field being not set in the received packet is a second condition for matching, wherein the '−' sign prefixes a representation of the first field in the ACL;
   means for defining a match all indication for the defined set and not-set indications in the ACL of the network device;
   means for matching the fields from the received packet with corresponding matching criteria of the ACL; and
   means for accepting the packet if and only if the plurality of fields associated with the received packet satisfies both the first and second conditions.

14. The system of claim 13, further comprising means for sending the accepted packet to a location within the network device when the accepted packet is an incoming packet.

15. The system of claim 13, further comprising means for transmitting the accepted packet to another device coupled to the network device via a network when the accepted packet is an outgoing packet.

16. The system of claim 13, wherein the ACL comprises an Internetworking Operating System (IOS) ACL.

17. The system of claim 16, wherein the IOS ACL comprises an IOS Turbo ACL.

18. The system of claim 13, wherein the network device comprises a router.

19. An Access Control List (ACL) interface for determining if a packet is acceptable for transmitting from a router, the ACL interface comprising:
   means for providing an ACL having access flags to the router;
   means for receiving a packet having packet flags in the ACL interface of the router;
   means for defining a set indication using a '+' sign in the ACL for a first access flag to indicate that a first packet flag being set in the received packet is a first condition for matching, wherein the '+' sign prefixes the first access flag in the ACL;
   means for defining a not-set indication using a '−' sign in the ACL for a second access flag to indicate that a second packet flag being not set in the received packet is a second condition for matching, wherein the '−' sign prefixes the second access flag in the ACL;
   means for defining a match all indication for the defined set and not-set indications in the ACL of the router; and
   means for matching in a corresponding one-to-one relationship first and second packet flags of the received packet with the first and second access flags of the ACL of the router to satisfy both the first and second conditions for indicating that the received packet is acceptable for transmitting.

20. An apparatus, comprising:
   A computer processor;
   a computer-readable storage medium including instructions executable by the computer processor, the storage medium comprising:
      one or more instructions for receiving a signal from a user input device to define an access control list (ACL) in a network device, the ACL having an ACL entry that defines a configuration of transmission control protocol (TCP) flags;
      one or more instructions for receiving a signal from the user input device to define a set indication for a first TCP flag in the ACL entry, wherein the defined set indication includes a '+' sign prefixing the first TCP flag in the ACL entry;
      one or more instructions for receiving a signal from the user input device to define a not-set indication for a second TCP flag in the ACL entry, wherein the defined not-set indication includes a '−' sign prefixing the second TCP flag in the ACL entry;
      one or more instructions for receiving a signal from the user input device to define a match all indication for the defined set and not-set indications in the ACL entry;
      one or more instructions for receiving a packet in the network device, the packet having first and second fields associated therewith, the first field corresponding to the first TCP flag, the second field corresponding to the second TCP flag; and
      one or more instructions for accepting the received packet in the network device if and only if the first field in the received packet is set and the second field in the received packet is not set.

21. A computer-readable storage medium including instructions executable by a computer processor, and when executed by the computer processor, operable to perform the following steps:
   receive a signal from a user input device to define an access control list (ACL) in a network device, the ACL having an ACL entry that defines a configuration of transmission control protocol (TCP) flags;

receive a signal from the user input device to define a set indication for a first TCP flag in the ACL entry, wherein the defined set indication includes a '+' sign prefixing the first TCP flag in the ACL entry;

receive a signal from the user input device to define a not-set indication for a second TCP flag in the ACL entry, wherein the defined not-set indication includes a '−' sign prefixing the second TCP flag in the ACL entry;

receive a signal from the user input device to define a match all indication for the defined set and not-set indications in the ACL entry;

receive a packet in the network device, the packet having first and second fields associated therewith, the first field corresponding to the first TCP flag, the second field corresponding to the second TCP flag; and accept the received packet in the network device if and only if the first field in the received packet is set and the second field in the received packet is not set.

* * * * *